US008111989B2

(12) United States Patent
Yang et al.

(10) Patent No.: US 8,111,989 B2
(45) Date of Patent: Feb. 7, 2012

(54) OPTICAL SWITCH AND OPTICAL SIGNAL COMMUNICATION SYSTEM

(75) Inventors: Chun-Liang Yang, Taipei County (TW); Dar-Zu Hsu, Tainan County (TW); Jian-Ting Hong, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 419 days.

(21) Appl. No.: 12/506,256

(22) Filed: Jul. 21, 2009

(65) Prior Publication Data

US 2010/0278531 A1 Nov. 4, 2010

(30) Foreign Application Priority Data

May 4, 2009 (TW) ................................ 98114702 A

(51) Int. Cl.
*H04B 10/00* (2006.01)
(52) U.S. Cl. .................. 398/45; 398/79; 398/82; 398/5; 359/484.05
(58) Field of Classification Search .................. 398/1–8, 398/45, 79; 359/484.05
See application file for complete search history.

(56) References Cited

U.S. PATENT DOCUMENTS

| | | | | |
|---|---|---|---|---|
| 5,204,771 A * | 4/1993 | Koga | ............................... | 359/281 |
| 5,633,741 A * | 5/1997 | Giles | ................................. | 398/79 |
| 5,689,593 A * | 11/1997 | Pan et al. | ......................... | 385/11 |
| 5,724,165 A | 3/1998 | Wu | | |
| 5,742,416 A * | 4/1998 | Mizrahi | ........................... | 398/92 |
| 5,838,477 A * | 11/1998 | Yamamoto et al. | ............ | 398/105 |
| 5,887,091 A * | 3/1999 | Jabr et al. | ........................... | 385/24 |
| 5,905,823 A * | 5/1999 | Shintaku et al. | ................. | 385/11 |
| 5,909,295 A * | 6/1999 | Li et al. | ............................ | 398/87 |
| 5,974,205 A * | 10/1999 | Chang | ................................ | 385/11 |
| 5,999,313 A * | 12/1999 | Fukushima | ............... | 359/484.05 |
| 6,014,475 A * | 1/2000 | Frisken | ............................ | 385/11 |
| 6,061,484 A * | 5/2000 | Jones et al. | ....................... | 385/24 |
| 6,154,581 A * | 11/2000 | Lu et al. | ........................... | 385/11 |
| 6,160,660 A * | 12/2000 | Aina et al. | ..................... | 359/341.2 |
| 6,215,922 B1 * | 4/2001 | Okayama | ......................... | 385/24 |
| 6,243,177 B1 * | 6/2001 | Duerksen | ........................... | 398/9 |
| 6,310,994 B1 * | 10/2001 | Jones et al. | ....................... | 385/24 |
| 6,339,661 B1 * | 1/2002 | Kokkelink et al. | ............... | 385/11 |
| 6,449,072 B1 * | 9/2002 | Sian et al. | ........................ | 398/82 |
| 6,538,815 B1 * | 3/2003 | Cao | ............................ | 359/484.05 |
| 6,545,779 B1 * | 4/2003 | Liu et al. | .......................... | 398/14 |
| 6,587,267 B2 * | 7/2003 | Tai et al. | ................... | 359/484.05 |
| 6,590,706 B1 * | 7/2003 | Xie et al. | .................. | 359/484.05 |
| 6,594,068 B2 * | 7/2003 | Sui | .................................. | 359/280 |
| 6,608,709 B2 * | 8/2003 | Duerksen | ......................... | 398/43 |
| 6,631,245 B1 * | 10/2003 | Bendelli et al. | ................. | 398/83 |
| 6,636,651 B2 * | 10/2003 | Li | .................................... | 385/11 |
| 6,643,064 B2 * | 11/2003 | Huang et al. | .............. | 359/484.07 |
| 6,657,785 B2 * | 12/2003 | Ducellier et al. | ......... | 359/484.03 |
| 6,747,797 B2 * | 6/2004 | Liu et al. | .................. | 359/484.05 |
| 6,751,366 B2 * | 6/2004 | Li | .................................... | 385/11 |

(Continued)

*Primary Examiner* — Agustin Bello
(74) *Attorney, Agent, or Firm* — Jianq Chyun IP Office

(57) ABSTRACT

An optical switch including a first reversible optical circulator and a second reversible optical circulator is provided. Each of the first reversible optical circulator and the second reversible optical circulator respectively has four I/O ports, wherein the four I/O ports are respectively a first terminal, a second terminal, a third terminal, and a fourth terminal, the four terminals sequentially transmit an optical signal in a forward circulation or a backward circulation according to a control signal, and an open end is formed between the first terminal and the adjacent fourth terminal. The open ends of the first reversible optical circulator and the second reversible optical circulator are coupled with each other.

15 Claims, 6 Drawing Sheets

U.S. PATENT DOCUMENTS

| | | | |
|---|---|---|---|
| 6,819,481 B2 * | 11/2004 | Delavaux et al. | 359/341.2 |
| 6,882,759 B1 * | 4/2005 | Li | 385/11 |
| 6,888,971 B2 * | 5/2005 | Li | 385/11 |
| 6,954,307 B2 * | 10/2005 | Shao | 359/484.04 |
| 6,965,472 B2 * | 11/2005 | Efimov et al. | 359/484.05 |
| 7,103,241 B2 * | 9/2006 | Kim et al. | 385/16 |
| 7,228,021 B2 * | 6/2007 | Jung et al. | 385/14 |
| 7,274,510 B2 * | 9/2007 | Wang et al. | 359/484.05 |
| 7,362,504 B2 * | 4/2008 | Pan et al. | 359/484.05 |
| 2001/0038478 A1 * | 11/2001 | Hwang | 359/124 |
| 2004/0208420 A1 * | 10/2004 | Kim et al. | 385/16 |
| 2005/0259325 A1 * | 11/2005 | Ghidini et al. | 359/487 |

* cited by examiner (a)

(b)

OPTICAL SWITCH AND OPTICAL SIGNAL COMMUNICATION SYSTEM

CROSS-REFERENCE TO RELATED APPLICATION

This application claims the priority benefit of Taiwan application serial no. 98114702, filed on May 4, 2009. The entirety of the above-mentioned patent application is hereby incorporated by reference herein and made a part of specification.

BACKGROUND

1. Technical Field

The present invention relates to an optical switch which can be applied to an optical signal communication system.

2. Description of Related Art

The fiber-optic communication technique is currently the optimal technique in the wired communication technology and which has been broadly applied to backbone network systems. The transmission medium (i.e., optical fiber) adopted in the fiber-optic communication technique has such characteristics as low transmission loss, extra broad bandwidth, free of electromagnetic interference, small volume, light weight, and high security. Each communication node in a fiber-optic communication network requires an uplink path and a downlink path for transmitting and receiving information, so as to achieve bi-directional information transmission. Generally, the uplink path and the downlink path respectively transmit data on the different optical fiber path. If a working optical fiber path is broken, the system switches the channel-fault optical signals to a corresponding protection optical fiber path according to a protection mechanism. Due to the limitation in the switching states of conventional optical switches, a plurality of fiber-optic protection paths has to be implemented in a fiber-optic communication system in order to maintain a good data transmission performance of the system.

In order to reduce the cost of a fiber-optic communication network and increase the flexibility of the network design, techniques for improving the switching states of an optical switch and accordingly reducing the number of fiber-optic paths implemented between communication nodes have been provided. FIG. 1 is a diagram illustrating the switching states of a conventional optical switch. Referring to FIG. 1, an optical switch is disclosed in U.S. Pat. No. 5,724,165. The optical switch 90 is a 2×2 optical switch and which has two input terminals 104 and 108 and two output terminals 106 and 110. The optical switch 90 has two switching states, namely, the bar state as shown in FIG. 1(a) and the cross state as shown in FIG. 1(b). When the optical switch 90 is in the bar state as shown in FIG. 1(a), an optical signal is transmitted from the input terminal 104 to the output terminal 106 through the optical path 100, and contrarily, the optical signal can be transmitted in a reverse direction from the output terminal 110 to the input terminal 108 through the optical path 102, as indicated by the arrows 112 and 118. The optical signal may also be transmitted through the optical paths as indicated by the arrows 114 and 116.

When the optical switch 90 is in the cross state as shown in FIG. 1(b), the optical signal can be transmitted from the input terminal 104 to the output terminal 110 through the optical path 102, as indicated by the arrow 112, and contrarily, the optical signal can also be transmitted in the reverse direction from the output terminal 106 to the input terminal 108 through the optical path 100, as indicated by the arrow 116. The optical signal may also be transmitted through the optical paths as indicated by the arrows 114 and 118. Bi-directional optical signals can be simultaneously transmitted on the same optical path in an optical switch, and this is referred to as the reciprocal attribute of an optical switch.

FIG. 2 is a diagram illustrating the switching states of another conventional optical switch. Referring to FIG. 2, another optical switch 120 is disclosed in U.S. Pat. No. 6,594,068. The optical switch 120 has two switching states for transmitting optical signals through the unidirectional optical paths 122 and 124, as shown in FIG. 2(a) and FIG. 2(b). However, bi-directional optical signals cannot be transmitted on the same optical path in the optical switch 120, and this is referred to as the non-reciprocal attribute of an optical switch.

The switching states of an optical switch would determine the actual implementation of a fiber-optic network system. Thus, the more switching states an optical switch has, the more simplified the disposition of the fiber-optic network system is, or the more flexible it is to design and maintain the fiber-optic network system.

SUMMARY

Accordingly, the present disclosure is directed to an optical switch with multiple switching states.

Consistent with embodiments, there is directed to an optical signal communication system, wherein an optical switch with multiple switching states is adopted such that a fiber-optic network system can be simplified and a novel fiber-optic path protection mechanism can be provided.

Consistent with embodiments, there is provides an optical switch including a first reversible optical circulator and a second reversible optical circulator. Each of the first reversible optical circulator and the second reversible optical circulator has four I/O ports, wherein the four I/O ports are respectively a first terminal, a second terminal, a third terminal, and a fourth terminal, the four terminals sequentially transmit an optical signal in a forward circulation or a backward circulation according to a control signal, and an open end is formed between the first terminal and the adjacent fourth terminal. The open ends of the first reversible optical circulator and the second reversible optical circulator are coupled with each other.

Consistent with embodiments, there is also provides an optical switch including a first reversible optical circulator and a second reversible optical circulator. The first reversible optical circulator has four I/O ports, wherein the four I/O ports are respectively a first terminal, a second terminal, a third terminal, and a fourth terminal, the four terminals sequentially transmit an optical signal in a forward circulation or a backward circulation according to a control signal, the first terminal and the adjacent fourth terminal are isolated. The second reversible optical circulator has four I/O ports, wherein the four I/O ports are respectively a first terminal, a second terminal, a third terminal, and a fourth terminal, the four terminals sequentially transmit an optical signal in a forward circulation or a backward circulation according to a control signal, and the first terminal and the adjacent fourth terminal are isolated. The first terminal and the fourth terminal of the first reversible optical circulator are crossly connected to the first terminal and the fourth terminal of the second reversible optical circulator. The second terminals and the third terminals of the first reversible optical circulator and the second reversible optical circulator are respectively connected to a first communication node and a second communication node.

Consistent with embodiments, there is further provides an optical signal communication system including a first communication node, a second communication node, a first optical switch, and a second optical switch. The first communication node has a first transmitting terminal and a first receiving terminal. The second communication node has a second transmitting terminal and a second receiving terminal. The first optical switch has two terminals respectively connected to the first transmitting terminal and the first receiving terminal and another two terminals respectively connected to a first fiber-optic path and a second fiber-optic path. The second optical switch has two terminals respectively connected to the first fiber-optic path and the second fiber-optic path and another two terminals respectively connected to the second transmitting terminal and the second receiving terminal. Each of the first optical switch and the second optical switch includes a first reversible optical circulator and a second reversible optical circulator. Each of the first reversible optical circulator and the second reversible optical circulator has four I/O ports, wherein the four I/O ports are respectively a first terminal, a second terminal, a third terminal, and a fourth terminal, the four terminals sequentially transmit an optical signal in a forward circulation or a backward circulation according to a control signal, and the first terminal and the adjacent fourth terminal are isolated. The first terminal and the fourth terminal of the first reversible optical circulator are crossly connected to the first terminal and the fourth terminal of the second reversible optical circulator. The two second terminals of the first reversible optical circulator and the second reversible optical circulator in each of the first optical switch and the second optical switch are served as the two terminals of the first optical switch or the second optical switch, and the two third terminals thereof are served as the another two terminals of the first optical switch or the second optical switch.

Consistent with embodiments, there is further provides an optical switch including a plurality of reversible optical circulators. Each of the reversible optical circulators includes beam displacers, Faraday rotators, waveplates, and a magnetic field control element such that the reversible optical circulators can form a 2×2 optical switch, wherein the 2×2 optical switch has four switching states including: a first switching state, which is a bar state during a forward optical transmission and a cross state during a backward optical transmission; a second switching state, which is the cross state during the forward optical transmission and the bar state during the backward optical transmission; a third switching state, wherein a uplink path of the optical switch allows only the forward optical transmission, a downlink path thereof allows only the backward optical transmission, and the uplink path and the downlink path are in an optical isolation state; and a fourth switching state, wherein the downlink path of the optical switch allows only the forward optical transmission, the uplink path thereof allows only the backward optical transmission, and the uplink path and the downlink path are in the optical isolation state.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
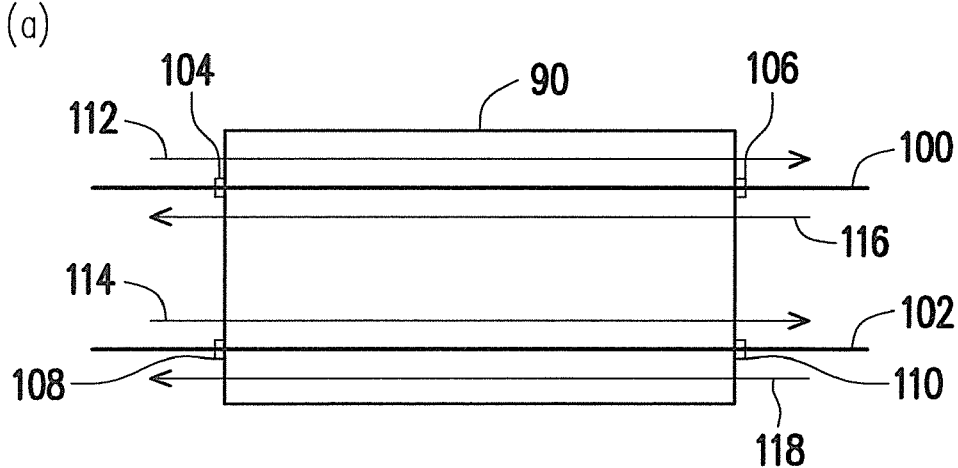
FIG. 1 is a diagram illustrating the switching states of a conventional optical switch.
Figure 1:
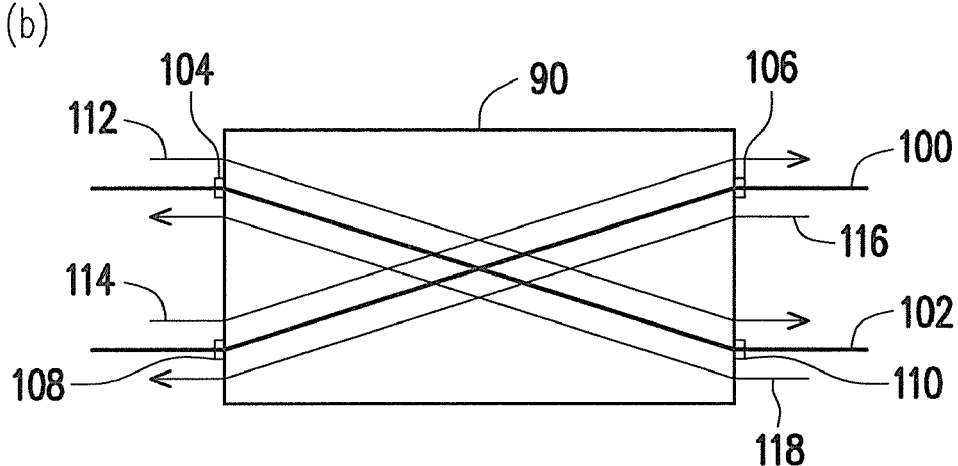
Figure 2:
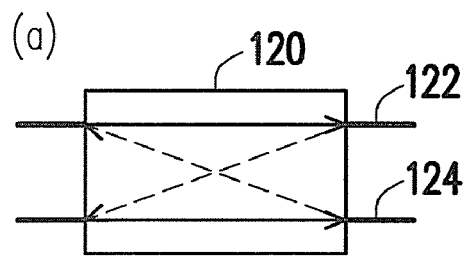
FIG. 2 is a diagram illustrating the switching states of another conventional optical switch.
Figure 2:
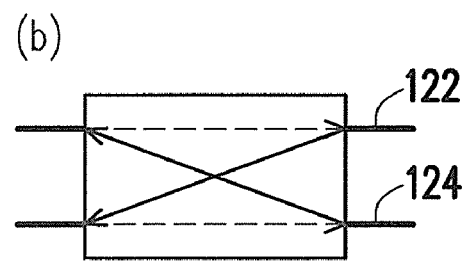

Reference will now be made in detail to the present preferred embodiments of the invention, examples of which are illustrated in the accompanying drawings. Wherever possible, the same reference numbers are used in the drawings and the description to refer to the same or like parts.

Figure 3:
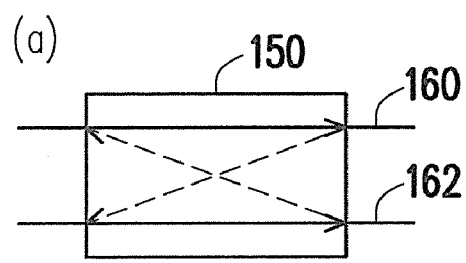
FIG. 3 is a diagram illustrating the four switching states of an optical switch according to an embodiment of the present invention.
Figure 3:
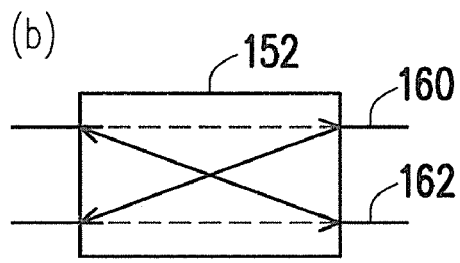
Figure 3:
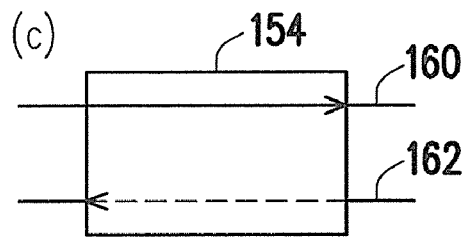
Figure 3:
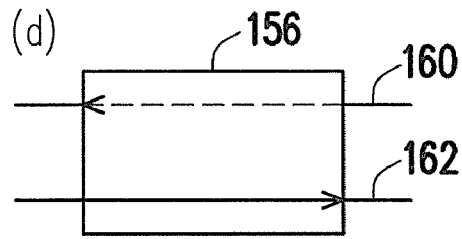

The present invention provides a 2×2 optical switch with four switching states. FIG. 3 is a diagram illustrating the four switching states of the optical switch according to an embodiment of the present invention. Referring to FIG. 3, the optical switch can be switched to four switching states 150, 152, 154, and 156. Optical signals are transmitted between two external optical paths 160 and 162 according to different switching states of the optical switch. As shown in FIG. 3(a), the optical switch is in the switching mode 150 when it is always in a bar state during a forward optical transmission and a cross state in a backward optical transmission. As shown in FIG. 3(b), the optical switch is in the switching mode 152 when it is always in the cross state during the forward optical transmission and the bar state during the backward optical transmission. The switching states 150 and 152 are features of a non-reciprocal optical switch. As shown in FIG. 3(c), the optical switch is in the switching mode 154 if an optical signal can only be forwardly transmitted by an uplink port and backwardly transmitted by a downlink port. As shown in FIG. 3(d), the optical switch is in the switching mode 156 if an optical signal can only be forwardly transmitted by a downlink port and backwardly transmitted by an uplink port. The switching states 154 and 156 provide an optical isolation function in reverse directions. The optical switch in the present invention allows the design of a fiber-optic network to be more flexible and economical.

Figure 4:
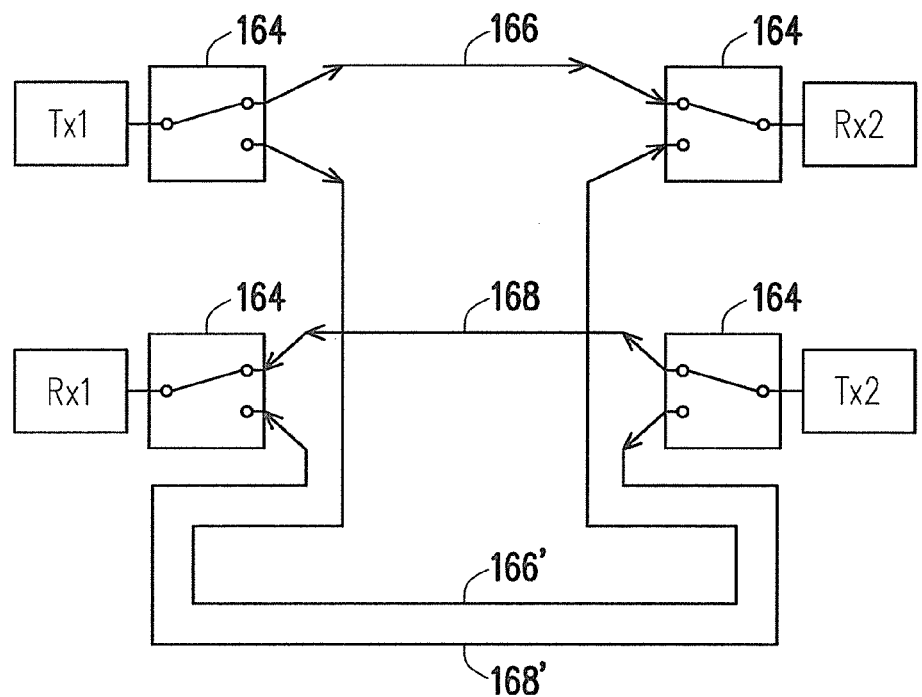
FIG. 4 is a schematic diagram of a fiber-optic communication system.

FIG. 4 is a schematic diagram of a fiber-optic communication system. Referring to FIG. 4, the fiber-optic communication system will be described herein with a simple 1×2 optical switch 164, wherein the optical switch 164 transmits an optical signal in two directions through two optical paths 166 and 168 thereof. However, the optical signal may not be transmitted due to errors on the optical paths 166 and 168. In order to prevent error from occurring on one or both of the optical paths 166 and 168 and accordingly the entire communication system being maimed, two spare optical paths 166' and 168' are usually implemented such that when an error occurs on one of the optical paths 166 and 168, the optical switch 164 can be switched to the corresponding spare optical path 166' or 168'. Thus, in the conventional technique, two sets of optical paths have to be implemented to provide the protection function. However, if the optical switch in the present invention is adopted, one set of optical paths is enough for providing the protection function. However, the protection function may be further enhanced by disposing another set of optical paths.

Figure 5:
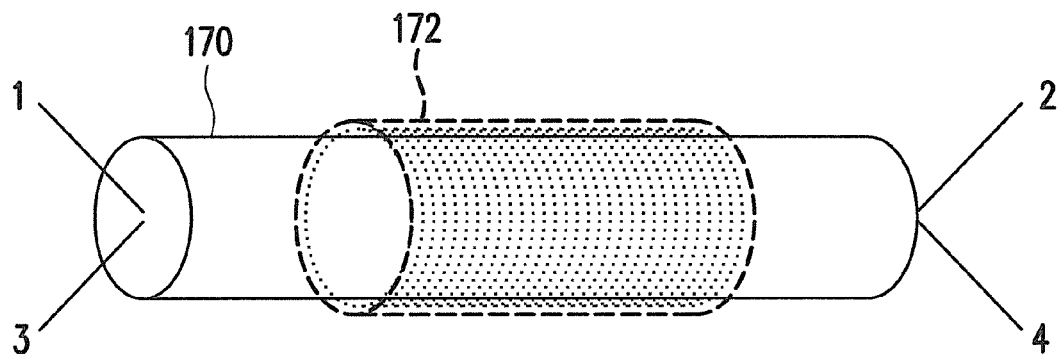
FIG. 5 is a diagram of a reversible optical circulator according to an embodiment of the present invention.

An optical switch composed of reversible optical circulators is provided by the present invention in order to achieve the switching function as shown in FIG. 3. FIG. 5 is a diagram of a reversible optical circulator according to an embodiment of the present invention. Referring to FIG. 5, the reversible optical circulator includes an optical circulator 170 and a magnetic field control element 172 controlled by a control signal. The optical circulator 170 has four I/O ports, wherein the four I/O ports are respectively referred to as a first terminal (port 1), a second terminal (port 2), a third terminal (port 3), and a fourth terminal (port 4). The optical circulator 170 has magnetic units formed of semi-hard magnetic materials built in Faraday rotators. The magnetic field control element 172 may be a coil and which generates a first-direction magnetic field or a second-direction magnetic field according to a control signal and supplies the first-direction magnetic field or the second-direction magnetic field to the optical circulator 170 to change a magnetic polarity. Accordingly, the first terminal, the second terminal, the third terminal, and the fourth terminal sequentially transmit an optical signal in a forward circulation or a backward circulation. Besides, the first terminal and the adjacent fourth terminal are isolated.

An optical circulator includes beam displacers, Faraday rotators, waveplates, and a magnetic field control element. The magnetic field control element controls a magnetic field controller through an external control signal to change the magnetic polarity and magnetic force of the semi-hard magnetic material built in the Faraday rotator and accordingly to change the optical polarization rotation direction of the Faraday rotator, so that a reversible optical circulator is formed. Moreover, a 2×2 optical switch with reconfigurable internal optical paths can be composed of the reversible optical circulators.

The theoretical mechanism of the optical circulator will be roughly described herein. The Faraday rotator works according to the Faraday magneto-optical effect. The polarization rotation angle of the Faraday rotator changes along with the intensity of an external magnetic field. The polarization rotation angle of an input light wave is changed when it passes through the Faraday rotator. After that, the input light wave passes through the polarization beam combiner (beam displacer) and is output to a fiber-optic path. Because two optical paths TE and TM are formed after the input light wave passes through the polarization beam splitter (beam displacer) and the polarization state of each of the optical paths is changed after the input light wave passes through the Faraday rotator, a linear polarization filtering effect is produced on the polarization beam combiner (beam displacer) and accordingly the intensity of the input light wave is changed. When the polarization rotation angle of the Faraday rotator allows the optical circulator to enter a light advancing direction changing state, the input light wave in the original direction is almost entirely blocked (i.e., the light advancing direction is switched).

A lower driving current is achievable if the optical circulator is wrapped with a coil and the coil is covered by a magnetoconductive material. When a forward current pulse passes through the coil, the semi-hard magnetic material in the optical circulator induces the corresponding magnetic field and keeps its magnetic force. As a result, the rotation direction of the Faraday rotator is affected and the light advancing direction is reversed. When a backward current pulse passes through the coil, the semi-hard magnetic material in the optical circulator induces the corresponding magnetic field and keeps its magnetic force. As a result, the rotation direction of the Faraday rotator is affected and the light advancing direction is restored. In short, the light advancing direction is changed by supplying a current pulse in different direction.

Figure 6:
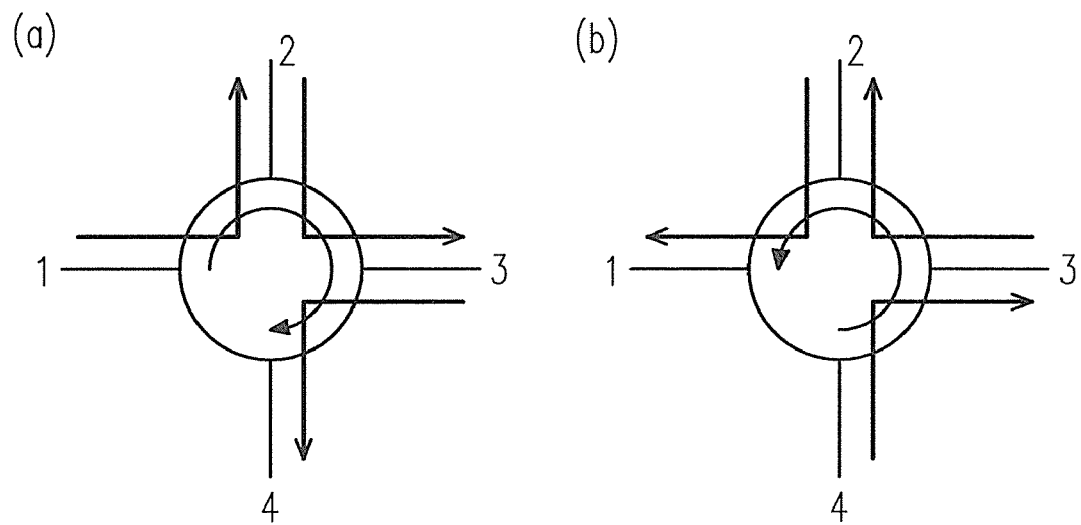
FIG. 6 is a diagram illustrating the circulation function of the reversible optical circulator in FIG. 5.

FIG. 6 is a diagram illustrating the circulation function of the reversible optical circulator in FIG. 5. Referring to FIG. 6(a), the forward circulation of the reversible optical circulator (as indicated by the clockwise arrow) is to circulate from the first terminal to the fourth terminal. If an optical signal is input from the first terminal, it is output from the second terminal. Similarly, if the optical signal is input from the second terminal, it is output from the third terminal. If the optical signal is input from the third terminal, it is output from the fourth terminal. If the optical signal is input from the fourth terminal, the optical signal is not circulated since the first terminal and the fourth terminal are isolated. Referring to FIG. 6(b), the reversible optical circulator may also be in a backward circulation, as indicated by the anticlockwise arrow.

Figure 7:
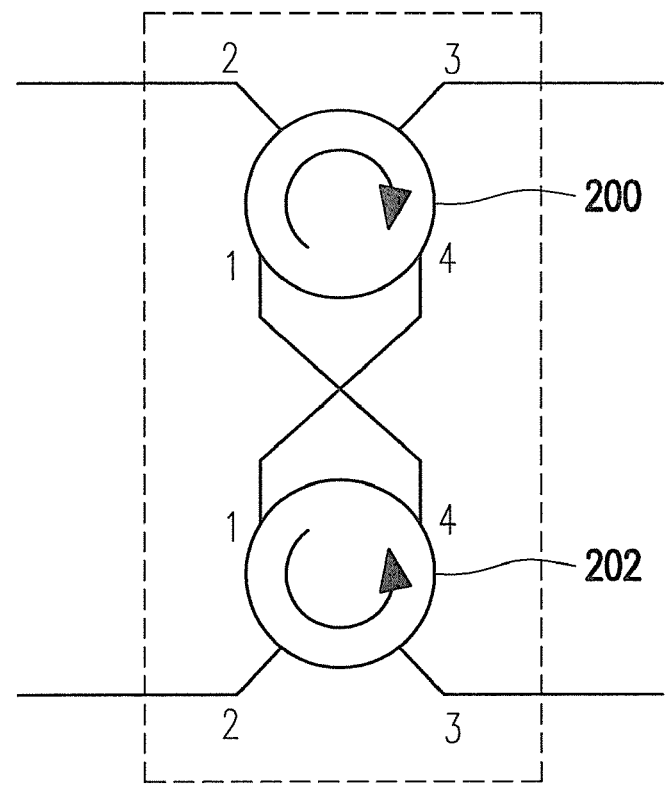
FIG. 7 is a diagram of an optical switch according to an embodiment of the present invention.

FIG. 7 is a diagram of an optical switch according to an embodiment of the present invention. Referring to FIG. 7, in an embodiment of the present invention, the optical switch is a 2×2 optical switch and which is composed of two reversible optical circulators 200 and 202. The two reversible optical circulators 200 and 202 are coupled together by coupling the two open ends thereof with each other. In each of the reversible optical circulators, the first terminal and the adjacent fourth terminal are isolated so that an open end is formed between the two terminals. The two open ends may be coupled to each other by connecting the two first terminals with each other and the two fourth terminals with each other. However, to describe the present embodiment conveniently and to achieve a symmetrical disposition, the first terminals and the fourth terminals are crossly connected. The second terminals and the third terminals are used for connecting to external optical paths, so as to switch the optical switch into different switching states.

Figure 8:
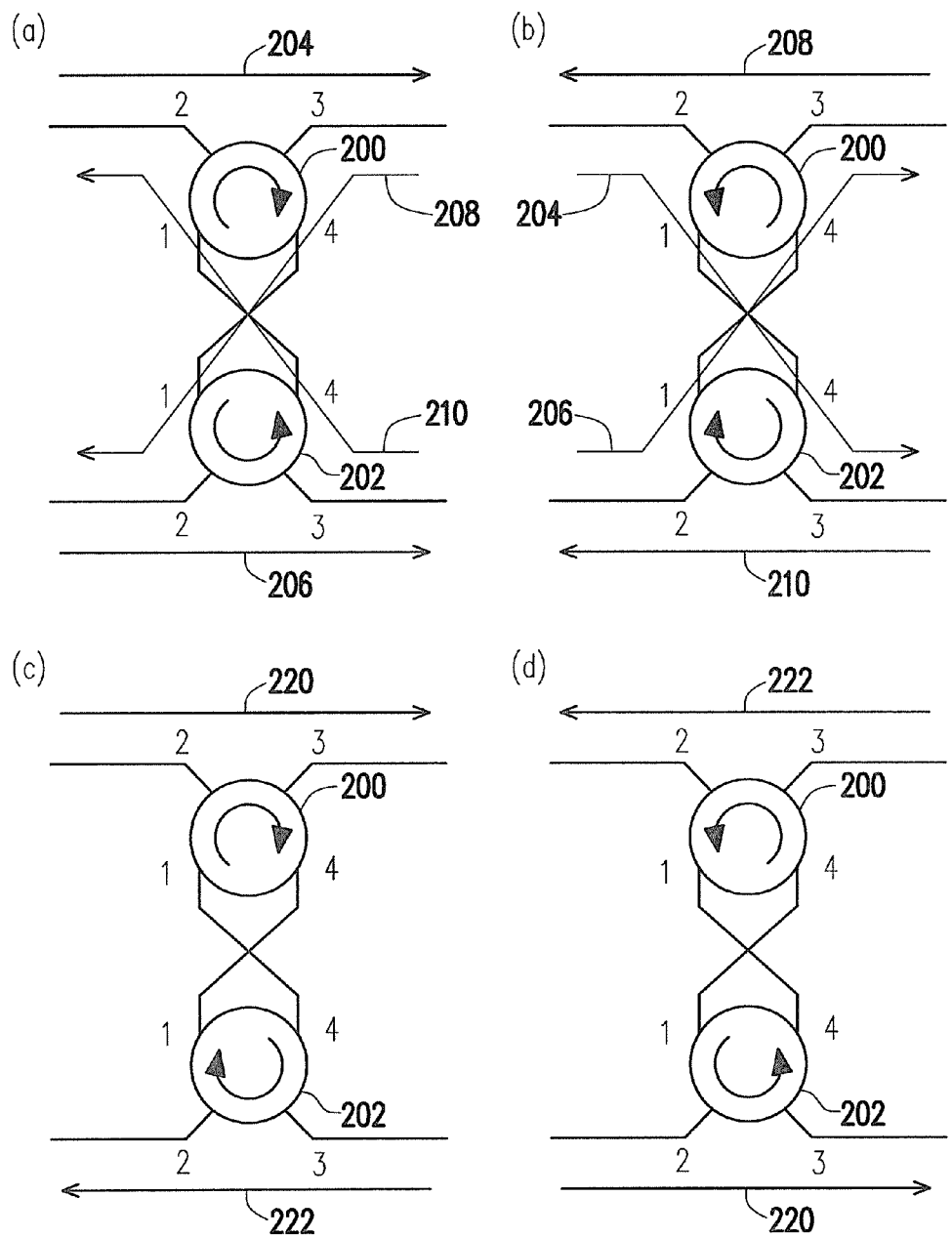
FIG. 8 is a diagram illustrating how the four switching states in FIG. 3 are achieved in the optical switch in FIG. 7 according to an embodiment of the present invention.

FIG. 8 is a diagram illustrating how the four switching states in FIG. 3 are achieved in the optical switch in FIG. 7 according to an embodiment of the present invention. The four switching states will be described below.

Referring to FIG. 8(a), the first switching state will be described with the second terminal at the left and the third terminal at the right as examples. The reversible optical circulator 200 and the reversible optical circulator 202 are both in the forward circulation. When an optical signal is transmitted from the second terminal to the third terminal, the optical switch is in a bar state as indicated by the optical paths 204 and 206. When the optical signal is transmitted from the third terminal to the second terminal, the optical switch is in a cross state as indicated by the optical paths 208 and 210.

Referring to FIG. 8(b), in the second switching state, the reversible optical circulator 200 is controlled to be in the backward circulation (i.e., circulates from the fourth terminal to the first terminal). The other reversible optical circulator 202 is also controlled to be in the backward circulation. Accordingly, the switching state of the optical switch is reverse to that as shown in FIG. 8(a). Namely, when an optical signal is transmitted from the second terminal to the third terminal, the optical switch is in the cross state as indicated by the optical paths 204 and 206. When the optical signal is transmitted from the third terminal to the second terminal, the optical switch is in the bar state as indicated by the optical paths 208 and 210.

Referring to FIG. 8(c), in the third switching state, the reversible optical circulator 200 is controlled to be in the forward circulation while the reversible optical circulator 202 is controlled to be in the backward circulation. Thus, when an optical signal is transmitted from the second terminal to the third terminal, the optical signal can only be transmitted by the reversible optical circulator 200 through the optical path 220. Contrarily, when the optical signal is transmitted from the third terminal to the second terminal, the optical signal can only be transmitted by the reversible optical circulator 202 through the optical path 222.

Referring to FIG. 8(d), in the fourth switching state, the reversible optical circulator 200 is controlled to be in the backward circulation while the reversible optical circulator 202 is controlled to be in the forward circulation. Unlike that illustrated in FIG. 8(c), the optical path 222 only passes through the reversible optical circulator 200, and the optical path 220 only passes through the reversible optical circulator 202. Namely, the two reversible optical circulators 200 and 202 are isolated from each other.

In other words, the two reversible optical circulators are controlled by two control signals to be in the forward circulation or the backward circulation so that the four switching states can be achieved. In the first switching state, the optical switch is in the bar state during the forward optical transmission and the cross state during the backward optical transmission, as shown in FIG. 8(a). In the second switching state, the optical switch is in the cross state during the forward optical transmission and the bar state during the backward optical transmission, as shown in FIG. 8(b). In the third switching state, an uplink path of the optical switch allows on the forward optical transmission, and a downlink path thereof allows only the backward optical transmission, as shown in FIG. 8(c). The uplink path and the downlink path are in an optical isolation state. In the fourth switching state, the downlink path of the optical switch allows only the forward optical transmission, and the uplink path thereof allows only the backward optical transmission, as shown in FIG. 8(d). The uplink path and the downlink path are in an optical isolation state. Generally speaking, the connection between the two reversible optical circulators 200 and 202 is not limited to that illustrated in FIG. 8; instead, the two reversible optical circulators may also be coupled to other optical devices.

Figure 9:
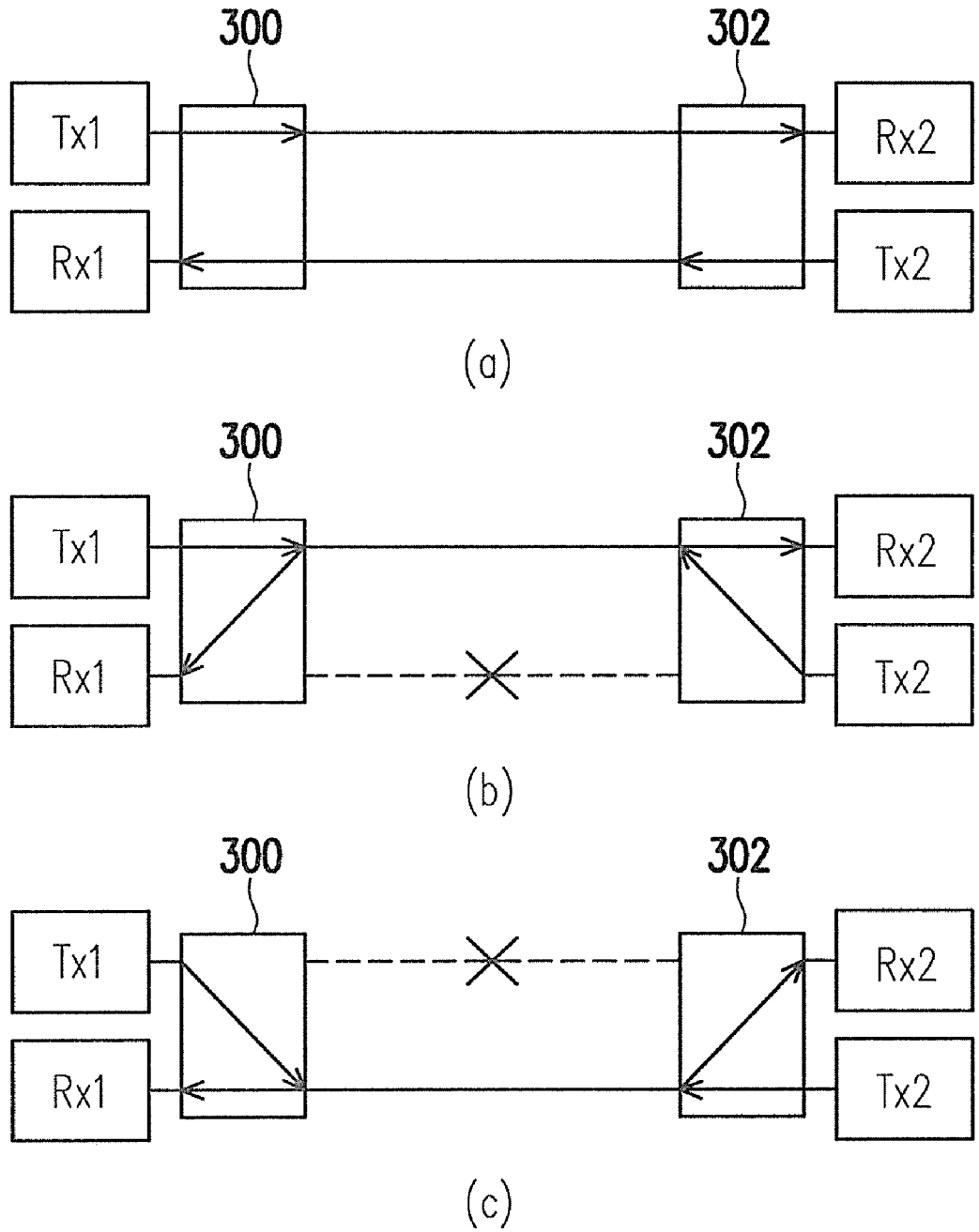
FIG. 9 is a diagram of an optical signal communication system according to an embodiment of the present invention.

FIG. 9 is a diagram of an optical signal communication system according to an embodiment of the present invention. Referring to FIG. 9(a), two optical switches as shown in FIG. 8 are implemented on two nodes of the communication system. The optical switch 300 is implemented on one node to be connected to a transmitting terminal Tx1 and a receiving terminal Rx1, and the optical switch 302 is implemented on the other node to be connected to a transmitting terminal Tx2 and a receiving terminal Rx2. The communication system can perform bi-directional communication between two nodes normally by setting different switching states of the optical switches 300 and 302. Referring to FIG. 9(b), when an error occurs on one of the optical paths (as indicated by the dotted line), the optical path cannot be used for communication. In this case, the switching states of the optical switches 300 and 302 can be changed so that the bi-directional communication can be carried out by using only one of the optical paths. Accordingly, it is not necessary to dispose any spare protection path. FIG. 9(c) illustrates the same situation as that illustrated in FIG. 9(b), but an error occurs on the other optical path. In this case, the bi-directional communication can be carried out by changing the switching states of the optical switches 300 and 302. However, the application of the optical switch 300 in a fiber-optic communication system is not limited that described above; instead, the optical switch 300 may also be applied at anywhere in an optical system which requires optical path switching.

In other words, the present invention provides an optical switch with at least four switching states such that a fiber-optic network system and other related applications can be simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical switch, comprising:
   a first reversible optical circulator, having four I/O ports, wherein the four I/O ports are respectively a first terminal, a second terminal, a third terminal, and a fourth terminal, the four terminals sequentially transmit an optical signal in a forward circulation or a backward circulation according to a first control signal, and an open end is formed between the first terminal and the adjacent fourth terminal; and
   a second reversible optical circulator, having four I/O ports, wherein the four I/O ports are respectively a first terminal, a second terminal, a third terminal, and a fourth terminal, the four terminals sequentially transmit an optical signal in a forward circulation or a backward circulation according to a second control signal, and an open end is formed between the first terminal and the adjacent fourth terminal,
   wherein the two open ends of the first reversible optical circulator and the second reversible optical circulator are coupled with each other.

2. The optical switch according to claim 1, wherein the first reversible optical circulator and the second reversible optical circulator are respectively controlled to be in the forward circulation or the backward circulation according to the first control signal and the second control signal, so as to achieve a plurality of switching states of the optical switch, the optical switch allows a forward optical transmission and a backward optical transmission, and the switching states comprise:
   a first switching state, being a bar state during the forward optical transmission and a cross state during the backward optical transmission;
   a second switching state, being the cross state during the forward optical transmission and the bar state during the backward optical transmission;
   a third switching state, wherein a uplink path of the optical switch allows only the forward optical transmission, a downlink path of the optical switch allows only the backward optical transmission, and the uplink path and the downlink path are in an optical isolation state; and
   a fourth switching state, wherein the downlink path of the optical switch allows only the forward optical transmission, the uplink path of the optical switch allows only the backward optical transmission, and the uplink path and the downlink path are in the optical isolation state.

3. An optical switch, comprising:
   a first reversible optical circulator, having four I/O ports, wherein the four I/O ports are respectively a first terminal, a second terminal, a third terminal, and a fourth terminal, the four terminals sequentially transmit an optical signal in a forward circulation or a backward circulation according to a control signal, and the first terminal and the adjacent fourth terminal are isolated; and a second reversible optical circulator, having four I/O ports, wherein the four I/O ports are respectively a first terminal, a second terminal, a third terminal, and a fourth terminal, the four terminals sequentially transmit an optical signal in a forward circulation or a backward circulation according to a control signal, and the first terminal and the adjacent fourth terminal are isolated, wherein the first terminal and the fourth terminal of the first reversible optical circulator are crossly connected to the first terminal and the fourth terminal of the second reversible optical circulator, wherein the second terminals and the third terminals of the first reversible optical circulator and the second reversible optical circulator are respectively connected to a first communication node and a second communication node.

4. The optical switch according to claim 3, wherein each of the first reversible optical circulator and the second reversible optical circulator comprises:
an optical circulator, having the four I/O ports, wherein the optical circulator has magnetic units formed of semi-hard magnetic materials built in Faraday rotators; and
a magnetic field control element, for generating a first-direction magnetic field or a second-direction magnetic field according to a control signal, and supplying the first-direction magnetic field or the second-direction magnetic field to the optical circulator to change a magnetic polarity of the magnetic unit, so as to achieve the forward circulation or the backward circulation.

5. The optical switch according to claim 3, wherein a switching state is for controlling the first reversible optical circulator to be in the forward circulation and the second reversible optical circulator to be in the forward circulation.

6. The optical switch according to claim 3, wherein a switching state is for controlling the first reversible optical circulator to be in the backward circulation and the second reversible optical circulator to be in the backward circulation.

7. The optical switch according to claim 3, wherein a switching state is for controlling the first reversible optical circulator to be in the forward circulation and the second reversible optical circulator to be in the backward circulation.

8. The optical switch according to claim 3, wherein a switching state is for controlling the first reversible optical circulator to be in the backward circulation and the second reversible optical circulator in the forward circulation.

9. An optical signal communication system, comprising:
a first communication node, having a first transmitting terminal and a first receiving terminal;
a second communication node, having a second transmitting terminal and a second receiving terminal;
a first optical switch, having two terminals respectively connected to the first transmitting terminal and the first receiving terminal and another two terminals respectively connected to a first fiber-optic path and a second fiber-optic path; and
a second optical switch, having two terminals respectively connected to the first fiber-optic path and the second fiber-optic path and another two terminals respectively connected to the second transmitting terminal and the second receiving terminal,
wherein each of the first optical switch and the second optical switch comprises:
a first reversible optical circulator, having four I/O ports, wherein the four I/O ports are respectively a first terminal, a second terminal, a third terminal, and a fourth terminal, the four terminals sequentially transmit an optical signal in a forward circulation or a backward circulation according to a control signal, and the first terminal and the adjacent fourth terminal are isolated; and
a second reversible optical circulator, having four I/O ports, wherein the four I/O ports are respectively a first terminal, a second terminal, a third terminal, and a fourth terminal, the four terminals sequentially transmit an optical signal in a forward circulation or a backward circulation according to a control signal, and the first terminal and the adjacent fourth terminal are isolated,
wherein the first terminal and the fourth terminal of the first reversible optical circulator are crossly connected to the first terminal and the fourth terminal of the second reversible optical circulator,
wherein the second terminals in the first reversible optical circulator and the second reversible optical circulator of each of the first optical switch and the second optical switch are served as the two terminals of the first optical switch or the second optical switch, and the third terminals in the first reversible optical circulator and the second reversible optical circulator of each of the first optical switch and the second optical switch are served as the another two terminals of the first optical switch or the second optical switch.

10. The communication system according to claim 9, wherein each of the first reversible optical circulator and the second reversible optical circulator comprises:
an optical circulator, having four I/O ports, wherein the optical circulator has magnetic units formed of semi-hard magnetic materials built in Faraday rotators; and
a magnetic field control element, for generating a first-direction magnetic field or a second-direction magnetic field according to a control signal, and supplying the first-direction magnetic field or the second-direction magnetic field on the optical circulator to change a magnetic polarity of the magnetic unit, so as to achieve the forward circulation or the backward circulation.

11. The communication system according to claim 9, wherein a switch state is for controlling the first reversible optical circulator to be in the forward circulation and the second reversible optical circulator to be in the forward circulation.

12. The communication system according to claim 9, wherein a switch state is for controlling the first reversible optical circulator to be in the backward circulation and the second reversible optical circulator to be in the backward circulation.

13. The communication system according to claim 9, wherein a switch state is for controlling the first reversible optical circulator to be in the forward circulation and the second reversible optical circulator to be in the backward circulation.

14. The communication system according to claim 9, wherein a switch state is for controlling the first reversible optical circulator to be in the backward circulation and the second reversible optical circulator to be in the forward circulation.

15. An optical switch, comprising:
a plurality of reversible optical circulators, wherein each of the reversible optical circulators comprises beam displacers, Faraday rotators, waveplates, and a magnetic field control element such that the reversible optical circulators are connected into a 2×2 optical switch, and the 2×2 optical switch has four switching states including:
- a first switching state, being a bar state during a forward optical transmission and a cross state during a backward optical transmission;
- a second switching state, being the cross state during the forward optical transmission and the bar state during the backward optical transmission;
- a third switching state, wherein a uplink path of the optical switch allows only the forward optical transmission, a downlink path of the optical switch allows only the backward optical transmission, and the uplink path and the downlink path are in an optical isolation state; and
- a fourth switching state, wherein the downlink path of the optical switch allows only the forward optical transmission, the uplink path allows only the backward optical transmission, and the uplink path and the downlink path are in the optical isolation state.

\* \* \* \* \*